2,965,515
Patented Dec. 20, 1960

2,965,515

WATER SOLUBLE SILANE COMPOSITIONS AND PROCESS FOR TREATING FIBROUS GLASS MATERIALS

Maurice H. Jellinek, Williamsville, N.Y., assignor to Union Carbide Corporation, a corporation of New York No Drawing. Filed May 23, 1955, Ser. No. 510,554

9 Claims. (Cl. 117—126)

This invention relates to the treatment of fibrous glass material such as is employed in making laminated products from resins and glass cloth. More particularly, it is concerned with an improved process for sizing glass material with a water soluble monomeric vinylalkoxysilane, and with novel compositions of matter useful in such a process.

The production of glass cloth-polyester resin laminates has attained the status of an important industry. But it is still a major problem in the production of such laminates to obtain a permanently bonded composition which retains high strength, and especially under conditions of high humidity or in contact with water. Where exposure to water is encountered, laminates in which the strength is dependent upon a mechanical bond alone have been found to be very unsatisfactory.

The general improvement in physical properties of resin coated or bonded glass fibers, for example, flexural strength and wet strength retention, which results from sizing the fibers with organo-silicon chemicals, is well known in the art. My copending application for Letters Patent, Serial No. 345,263, filed March 27, 1953, now U.S. Patent No. 2,834,693, establishes that when the organic group is alkenyl and more particularly vinyl, the degree of improvement is much greater. Further, as also pointed out in this copending application, the materials and processes heretofore available for effecting this sizing treatment have had certain inherent disadvantages. Many of these disadvantages have stemmed from the necessity of using organic solvents as carriers for the organo-silicon compound employed. Such solvents are particularly objectionable in this art because of toxicity, flammability, high volatility, and high cost. A particularly vexing problem of both chemical supplier and reinforced resin fabricator has been the necessity for careful handling of the solvents and accurate proportioning in those cases where water-alcohol has been required. In many fabricators' plants relatively unskilled labor is employed and requirements for specific mixtures of solvents are often overlooked, with unsatisfactory products resulting. Thus, a silanic material of sufficient water solubility to eliminate the need for any carrier but water should meet with great success. From the standpoint of the silane supplier such is particularly desirable since 100% concentrates may now be shipped. The fabricator may then simply dissolve in water, add catalyst and apply to the glass fiber material.

It is a primary object of the invention to overcome the aforementioned difficulties by providing vinylalkoxysilane compositions which are soluble in water without the addition of emulsifying agents or solubilizers, such as alcohol. A further object is to provide a method for treating glass fibers with vinylalkoxysilane materials which are soluble in a water carrier, thereby overcoming the disadvantages inherent in the use of the flammable, toxic and more expensive solvents. These and additional objects and advantages will be apparent from the following description of the invention.

The present improvement is based on my discovery that certain vinylalkoxysilane compounds may be prepared which are soluble in water and that water solutions of such silanes containing a small amount of catalyst may then advantageously be employed for treating glass fibers prior to lamination thereof with polyesters and the like. Treatment of glass fibers can be carried out simply by immersing the glass cloth in the water solution of vinylalkoxysilane, followed by heating it to cure the silicon compound after removal of the excess water. The cured polysiloxane compound has been found to form an extremely good bond as between alternate layers of glass fibers and a suitable polyester resin.

The vinylalkoxysilanes which are sufficiently water soluble for use in my process may be represented generically as:

$$RSi[(OC_2H_4)_nOR']_3$$

where R is a vinyl radical, R' is a methyl or ethyl hydrocarbon radical, and $n$ is at least 1 but preferably not greater than about 7. Although these compounds containing more than 7 oxyethylene groups will form stable water solutions, the drying and condensing of the silane on the fibers will not easily and completely eliminate the alkylene oxide polymeric residues from the finished surface, and the effectiveness of a subsequent bond between the fibers and coating or laminating resin may be impaired.

These compounds may be prepared by directly esterifying the corresponding vinylchlorosilane with a slight excess of hydroxyl-containing alkylene oxide molecule followed by fractional distillation at reduced pressure or esterifying the vinylchlorosilane with a low boiling alcohol, such as ethanol, and then conducting a transesterification reaction to replace the ethoxy group with the desired alkoxy substituent. A suitable catalyst may be used to speed the transesterification reaction.

Although I do not wish to be bound by any particular theory, it is believed that the net effect of the reaction above described is to form a water-soluble alkoxy substituted silane from a chlorosilane, capable of undergoing hydrolysis and condensation on the glass fiber.

Examples of compounds corresponding to the above general formula are vinyl tris-2-methoxyethoxy silane, vinyltrismethoxydiethyleneglycoxysilane, and monomethoxypolyethyleneglycoxydiethoxyvinylsilane. Although polymers corresponding to the last-named compound having a molecular weight of from about 200 to about 600 may be advantageously employed in practicing the invention, the preferred molecular weight range is from about 350 to about 450.

Set forth below are illustrative examples for the purpose of demonstrating the manner in which compounds of the type above described may be prepared.

EXAMPLE I

Preparation of vinyl tris-2-methoxyethoxy silane

A mixture of 1.0 mole (190 g.) of vinyltriethoxysilane, 3.0 moles (228 g.) methyl "Cellosolve" ($CH_3OC_2H_4OH$) (a product of Carbide and Carbon Chemicals Division of Union Carbide and Carbon Corp.), and 2.0 g. potassium silanolate (containing 3.1% K), were dissolved in 200 ml. of toluene and then refluxed. The toluene-alcohol azeotrope was removed at 77–80° C. Refluxing was continued until the head temperature of the fractionating column remained constant at 108° C. at which time the column was put on total reflux for another four hours. The solution was then distilled under reduced pressure to remove all volatile material from the alkaline catalyst. The volatile material was then fractionated at reduced pressure. The following fractions were obtained as constant boiling materials:

I. A compound determined by bromine absorption to be vinylbis(2-methoxyethoxy)ethoxysilane was found to have the following properties: B.P. 116.5–118° C./11 mm. Hg, 12.5 g. not completely water soluble.

II. A compound determined by bromine absorption to be tris(2-methoxyethoxy)vinylsilane was found to have the following properties:

B.P. 144.5–145.5/11 mm. Hg, 178 g. completely water soluble.
$n_D^{25}$ 1.4270, $d^{25}$ 1.04 g./cc.
Percent Si found—9.2%, theory 10.0%
Bromine absorption—0.54 g. $Br_2$ per g. of sample. Theory 0.57 g. $Br_2$ per g. of sample

EXAMPLE II

*Preparation of vinyltrismethoxydiethyleneglycoxysilane*

Two moles (323 g.) of vinyltrichlorosilane were placed in a glass kettle and to it, with agitation, was added 6 moles (720 g.) of dried methyl "Carbitol"

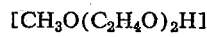
$[CH_3O(C_2H_4O)_2H]$ also a product of Carbide and Carbon Chemicals Division of Union Carbide and Carbon Corp. At the start of the "Carbitol" $[CH_3O(C_2H_4O)_2H]$ addition, the kettle temperature was 30° C. and at the conclusion (20 min. later), the temperature had risen to 40° C. The mixture was refluxed under vacuum which was varied from 80 to 20 mm. of mercury to assure maintenance of the head temperature of the column below 103° C. After 4 hours and 20 minutes all the hydrogen chloride had been removed and the product was neutral to indicator paper. 862 g. of product were recovered, which was suitable to prepare water solutions containing 20% of this product. Analysis of this product showed it to be 69% the desired ester, the balance being unreacted methyl "Carbitol" $[CH_3O(C_2H_4O)_2H]$ and vinyl polymers.

EXAMPLE III

Two moles (323 g.) of vinyltrichlorosilane were placed in a glass kettle equipped with a reflux condenser and a vent to allow the escape of hydrogen chloride. To this material was added 8 moles (960 g.) of methyl "Carbitol" $[CH_3O(C_2H_4O)_2H]$ which had been previously dried, with the mixture being agitated continuously. At the start of the addition the temperature of the chlorosilane was 27° C. and at the completion of the addition of the "Carbitol" $[CH_3O(C_2H_4O)_2H]$ the temperature was 49° C. The mixture was then heated under vacuum at 10 mm. mercury pressure for 6 hours until neutral. The reflux temperature was 87° C. and 1041 g. of product were recovered.

347 g. of this product were charged to vacuum distillation equipment and heated under 2 to 5 mm. of mercury. Volatile materials were removed until the kettle temperature reached 120° C. Upon cooling, 175 g. of product were recovered. Analysis of this product showed it to be 76% ester, 16% methyl "Carbitol"

$[CH_3O(C_2H_4O)_2H]$
and 11% siloxane polymers.

EXAMPLE IV

*Preparation of a monomethoxypolyethyleneglycoxydiethoxyvinylsilane*

A mixture of 1.0 mole (190 g.) of vinyltriethoxysilane, 1.0 mole (350 g.) of methoxypolyethyleneglycol "350" (a product of Carbide and Carbon Chemicals Division of Union Carbide and Carbon Corp. having a molecular weight of about 350) and 0.5 g. (0.1 wt. percent) trifluoroacetic acid were dissolved in 250 cc. toluene and the solution was then refluxed and low-boiling material taken off at the head of the fractionating column until the theoretical amount of alcohol was removed. The solution was then cooled down and anhydrous ammonia bubbled through the solution for 2 minutes to neutralize residual acid catalyst. And then solvent was removed under reduced pressure at a maximum kettle temperature of 95° C. at 10 mm. Hg. The product was an amber colored oil which was soluble in water. Forty-two grams of unreacted vinyltriethoxysilane were recovered from the material removed during solvent stripping. Silicon analysis of the product was 4.3% Si which corresponds to the empirical formula

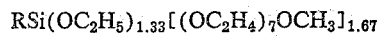
$RSi(OC_2H_5)_{1.33}[(OC_2H_4)_7OCH_3]_{1.67}$ where R is a vinyl radical.

As disclosed in my above-mentioned copending application, the amount of vinylalkoxysilane present in the glass sizing bath is not critical, and concentrations of vinylalkoxysilane from about 0.6 part by weight per 100 parts of water up to the upper limit of solubility of this compound have been employed with good results. An amount which is 1 part by weight per 100 parts of water is preferred.

The catalyst employed in the sizing bath may be any material which changes the pH of the water solution from neutral as determined by indicator paper (about 7) to either an acidic or an alkaline condition. Such materials include many salts, soaps and chelates. Examples of useful catalysts are the following: NaOH, KOH, $Na_2CO_3$, CaO, diethanolamine, quaternary ammonium hydroxides, $NH_4OH$, zirconium oxychloride, hydrochloric acid and trifluoroacetic acid. The amount of catalyst which is preferred is about 0.02 part by weight per 100 parts of water.

In carrying out my process, the glass fibers or other materials are saturated with the treated solution, as by immersion in a bath, in order that the vinylalkoxysilane compound will be picked by the fiber. After removal of the fibrous material from the bath, the excess water is removed by known expedients such as by air drying. Thereafter, the treated material is heated to cure the silane. For this purpose, a temperature of about 125° C. is preferred, but higher or somewhat lower temperatures can be employed if desired. In general, the higher the temperature, the shorter the heating period. Temperatures below 70° C. will usually be found to require an extremely long curing period for practical purposes. Temperatures as high as 275° C. can be employed, but for only a very short curing period. Ordinarily a temperature above 175° C. will be found to be unnecessary. Thereafter, laminates or other reinforced products may be made from the sized cloth using known procedures and standard techniques.

The following examples are illustrative to demonstrate the effectiveness of the herein-defined compounds:

EXAMPLE A

A solution of 6 grams of vinyl tris-2-methoxyethoxy silane and 0.12 gram of sodium hydroxide in sufficient water to make a total volume of 600 ml. was prepared. This solution was then used to treat glass cloth as follows:

The glass cloth employed had been previously heat cleaned and this was dipped into the aqueous silane solution immediately after preparation. Additional pieces of glass cloth were so treated at various solution ages up to 27 hours. The cloths were all air dried followed by cure at 125° C. for 20 minutes.

Laminates were prepared from this treated cloth by laying up alternate layers of the treated glass cloth and a commercial polyester laminating resin ("Selectron 5003" polyester resin, marketed by the Varnish Division of Pittsburgh Plate Glass Co.), in accord with customary practice. An excess of the polyester resin was placed between the layers and then some of the excess was squeezed out by pressing the laminate with a spatula. The laminates thus laid up were placed in a hydraulic press provided with steam-heated platens and subjected under pressure first to a pre-curing treatment at a temperature of about 50° C. to 70° C. for a period of 5 to 15 minutes and thereafter to a final curing temperature of 120° C. for at least twenty minutes. A sufficient number of plies were used to produce laminates about 0.105 inch thick. To aid in obtaining laminates of 0.105 inch thickness for comparative tests, spacers were employed to maintain platen separation.

The laminates were evaluated by carrying out tests of a flexural strength on specimens cut from the material, three tests being made on the material as cured, and three on specimens that were subjected to boiling tap water for a period of two hours, cooled to room temperature in water, and then tested wet. The flexural tests were carried out as described in Air Force Specification MILP-8013 (also Federal Specification LP-406a, Method No. 1031). A specimen, 4 inch by 1 inch, is placed on standardized supports, 2 inches apart, and the specimen then broken by a load applied midway between these two supports.

The results of the tests were as follows:

| Age of Solution at Time of Treatment | Flexural Strength, $10^3$ p.s.i. | |
|---|---|---|
| | Dry | Wet |
| Immediately after mixing | 68 | 56 |
| 15 min | 69 | 61 |
| 1.5 hr | 64 | 58 |
| 6.0 hr | 62 | 53 |
| 27.0 hr | 60 | 55 |

EXAMPLE B

The crude vinyl silane esters of Examples II and III were used to prepare water solutions in concentrations equivalent to 1% based on vinyltriethoxysilane plus .02% sodium hydroxide. Although these crude esters contained relatively small amounts of excess alcohol (unreacted methyl "Carbitol"), this alcohol was such a minor constituent in the water solution prepared for the glass priming treatment that it did not interfere with the successful application of the vinyl coating nor its effectiveness as a resin bonding agent. These solutions were then applied to heat cleaned glass cloth followed by air drying and curing at 125° C. for 20 min. Laminates were then prepared from this treated cloth by the same procedure as described in Example A. Test specimens from the laminates were tested with the following results:

| Specimen | Flexural Strength, $10^3$ p.s.i. | | |
|---|---|---|---|
| | Dry | Wet | Percent Retention |
| From Example II | 64 | 59 | 92 |
| From Example III | 68 | 65 | 96 |

EXAMPLE C

The vinyl silane ester of Example IV was used to prepare a water solution containing the equivalent of 5% of vinyltriethoxysilane plus 0.05% of sodium hydroxide. Glass cloth was treated by passing the cloth through this solution followed by drying and curing at 125° C. for 20 minutes. Laminates were made as described above in Example A. The laminates were evaluated by carrying out tests of flexural strength on both dry specimens and specimens which had been boiled in tap water for two hours. The dry strength averaged 46,000 p.s.i., and the wet strength averaged 35,000 p.s.i.

Having thus described my invention, what I claim as novel and desire to protect by Letters Patent is as follows:

1. In a process for treating fibrous glass material prior to the formation of a composite product with polyester resin, the improvement which comprises applying a vinyl silicon compound to said glass material from a water solution containing on a weight basis at least 0.6 part per 100 parts of water of a compound corresponding to the generic formula, $$RSi[(OC_2H_4)_nOR']_3$$

where R is selected from the group consisting of a vinyl radical, R' is selected from the group consisting of a methyl and an ethyl hydrocarbon radical and $n$ is from 1 to 7, and a catalytic amount of a material capable of imparting to said solution a pH other than about 7, and thereafter heating said treated glass fibrous material to cure the vinyl silicon compound deposited on said fibrous glass material.

2. The method which comprises applying a vinyl silicon compound to a fibrous glass material from a water solution containing on a weight basis at least 0.6 part per 100 parts of water of a compound corresponding to the generic formula, $$RSi[(OC_2H_4)_nOR']_3$$

where R is selected from the group consisting of a vinyl radical, R' is selected from the group consisting of a methyl and an ethyl hydrocarbon radical and $n$ is from 1 to about 7, and a catalytic amount of a material capable of imparting to said solution a pH other than about 7, and thereafter heating said treated glass fibrous material to cure the vinyl silicon compound deposited on said fibrous glass material.

3. The method which comprises applying a vinyl silicon compound to a fibrous glass material from a water solution containing on a weight basis at least 0.6 part per 100 parts of water of a compound corresponding to the generic formula, $$RSi[(OC_2H_4)_nOR']_3$$

where R is a vinyl radical, R' is a member selected from the group consisting of a methyl and an ethyl hydrocarbon radical and $n$ is from 2 to about 7, and a catalytic amount of a material capable of imparting to said solution a pH other than about 7, and thereafter heating said treated glass fibrous material to cure the vinyl silicon compound deposited on said fibrous glass material.

4. In a process for treating fibrous glass material prior to the formation of a composite product with polyester resin, the improvement which comprises applying a vinyl silicon compound to said glass material from a water solution containing on a weight basis at least 0.6 part per 100 parts of water of a compound corresponding to the generic formula, $$RSi[(OC_2H_4)_nOR']_3$$

where R is selected from the group consisting of a vinyl radical, R' is selected from the group consisting of a methyl and an ethyl hydrocarbon radical and $n$ is from 1 to about 7, and a catalytic amount of a material capable of imparting to said solution a pH other than about 7, and thereafter heating said treated glass fibrous material to a temperature of about 70° C. to 175° C. to cure the vinyl silicon compound deposited on said fibrous glass material.

5. In a process for treating fibrous glass material prior to the formation of a composite product with polyester resin, the improvement which comprises applying a vinyl silicon compound to said glass material from a water solution containing on a weight basis at least 0.6 part per 100 parts of water of a compound corresponding to the generic formula, $$RSi[(OC_2H_4)_nOR']_3$$

where R is selected from the group consisting of a vinyl radical, R' is selected from the group consisting of a methyl and an ethyl hydrocarbon radical and $n$ is from 1 to about 7, and a catalytic amount of a material capable of imparting to said solution a pH other than about 7, and thereafter heating said treated glass fibrous material to a temperature of about 125° C. to cure the vinyl silicon compound deposited on said fibrous glass material.

6. A composition for treating fibrous glass material prior to the formation of a composite product with polyester resin, said composition comprising a water solution containing on a weight basis at least 0.6 part per 100 parts of water of a compound corresponding to the formula,

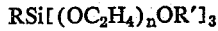

where R is a vinyl radical, R' is a member selected from the group consisting of a methyl and an ethyl hydrocarbon radical and $n$ is from 2 to about 7, and a catalytic amount of a material capable of imparting to said solution a pH other than about 7.

7. A composition for treating fibrous glass material as set forth in claim 6 wherein the compound is vinyl-trismethoxydiethyleneglycoxysilane.

8. A composition for treating fibrous glass material prior to the formation of a composite product with polyester resin, said composition comprising a water solution containing on a weight basis at least 0.6 part per 100 parts of water of a water soluble compound corresponding to the formula,

where R is a vinyl radical, R' is selected from the group consisting of a methyl and an ethyl hydrocarbon radical, and $n$ is from 1 to about 7, and a catalytic amount of a material capable of imparting to said solution a pH other than about 7.

9. A composition for treating fibrous glass material as set forth in claim 8 wherein the compound is vinyl tris-2-methoxyethoxy silane.

References Cited in the file of this patent

UNITED STATES PATENTS

| | | |
|---|---|---|
| 2,476,307 | Klein | July 19, 1949 |
| 2,532,583 | Tyron | Dec. 5, 1950 |
| 2,559,342 | Burkhard | July 3, 1951 |
| 2,563,288 | Steinman | Aug. 7, 1951 |
| 2,649,396 | Witt et al. | Aug. 18, 1953 |
| 2,688,006 | Steinman | Aug. 31, 1954 |
| 2,688,007 | Steinman | Aug. 31, 1954 |
| 2,763,629 | Gottfurcht | Sept. 18, 1956 |

OTHER REFERENCES

Burkhard: "Journal of Organic Chemistry," vol. 15 (1950), pages 106–107.

Nagel: "Journal of Organic Chemistry," vol. 17 (1952), pages 1382–1385.